(12) United States Patent
Humer et al.

(10) Patent No.: US 7,044,544 B2
(45) Date of Patent: May 16, 2006

(54) VEHICLE SEAT ASSEMBLY HAVING ACTIVE HEAD RESTRAINT SYSTEM

(75) Inventors: Mladen Humer, Eastpointe, MI (US); Gerald Locke, Lake Orion, MI (US); Eric Veine, Madison Heights, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/950,709

(22) Filed: Sep. 27, 2004

(65) Prior Publication Data

US 2006/0071517 A1 Apr. 6, 2006

(51) Int. Cl.
*B60N 2/42* (2006.01)

(52) U.S. Cl. .............................. 297/216.12; 297/216.1; 297/216.13

(58) Field of Classification Search ........... 297/216.12, 297/216.13, 216.14, 216.1
See application file for complete search history.

(56) References Cited

U.S. PATENT DOCUMENTS

| | | | |
|---|---|---|---|
| 5,651,582 A | 7/1997 | Nakano ................. | 297/216.13 |
| 5,673,972 A | 10/1997 | Dudash et al. ......... | 297/378.12 |
| 5,722,280 A | 3/1998 | Bodnar .................. | 297/216.12 |
| 5,722,722 A | 3/1998 | Massara ................ | 297/216.13 |
| 5,779,263 A | 7/1998 | Lane, Jr. et al. ......... | 280/730.2 |
| 5,868,466 A | 2/1999 | Massara et al. .......... | 297/284.6 |
| 5,884,968 A | 3/1999 | Massara ................ | 297/216.12 |
| 5,938,279 A | 8/1999 | Schubring et al. ..... | 297/216.12 |
| 6,024,406 A * | 2/2000 | Charras et al. ........ | 297/216.14 |
| 6,036,266 A | 3/2000 | Massara ..................... | 297/328 |
| 6,199,947 B1 | 3/2001 | Wiklund ................ | 297/216.12 |
| 6,213,549 B1 | 4/2001 | Wieclawski ............ | 297/216.13 |
| 6,340,206 B1 | 1/2002 | Andersson et al. .... | 297/216.14 |
| 6,375,262 B1 * | 4/2002 | Watanabe ................ | 297/284.4 |
| 6,398,299 B1 | 6/2002 | Angerer et al. ........ | 297/216.12 |
| 6,416,125 B1 | 7/2002 | Shah et al. ............. | 297/216.12 |
| 6,416,127 B1 | 7/2002 | Galbreath, Jr. et al. . | 297/216.13 |
| 6,523,892 B1 * | 2/2003 | Kage et al. ............ | 297/216.13 |
| 6,565,150 B1 | 5/2003 | Fischer et al. ......... | 297/216.12 |

(Continued)

FOREIGN PATENT DOCUMENTS

DE 19850758 A 5/2000

OTHER PUBLICATIONS

WO 01/064475 A1, Neale, Sep. 7, 2001.*

*Primary Examiner*—Peter M. Cuomo
*Assistant Examiner*—Sarah B. McPartlin
(74) *Attorney, Agent, or Firm*—Bill Panagos

(57) ABSTRACT

A vehicle seat assembly that includes a seatback frame and an upper armature moveably supported by the seatback frame. The upper armature includes a head restraint and a first impact body, and the upper armature is operable to move in response to a predetermined force applied to the first impact body to thereby move the head restraint toward the occupant. The vehicle seat assembly also includes a lower armature that is operatively connected to the upper armature and is operable to move toward the upper armature in response to a predetermined force applied to the lower armature and act on the upper armature to move the head restraint toward the occupant.

15 Claims, 3 Drawing Sheets

U.S. PATENT DOCUMENTS

| | | | |
|---|---|---|---|
| 6,604,788 B1 | 8/2003 | Humer | 297/216.13 |
| 6,719,368 B1 * | 4/2004 | Neale | 297/216.14 |
| 6,749,256 B1 | 6/2004 | Klier et al. | 297/216.12 |
| 6,789,845 B1 | 9/2004 | Farquhar et al. | 297/216.12 |
| 6,789,846 B1 * | 9/2004 | Humer et al. | 297/216.12 |
| 6,866,339 B1 * | 3/2005 | Itoh | 397/216.13 |
| 6,871,913 B1 * | 3/2005 | Malsch et al. | 297/410 |
| 2004/0075312 A1 | 4/2004 | Neale | 297/216.12 |
| 2004/0119324 A1 * | 6/2004 | Humer et al. | 297/216.12 |
| 2004/0160108 A1 | 8/2004 | Malsch et al. | 297/410 |
| 2004/0212227 A1 * | 10/2004 | Farquhar et al. | 297/216.13 |

* cited by examiner

VEHICLE SEAT ASSEMBLY HAVING ACTIVE HEAD RESTRAINT SYSTEM

BACKGROUND OF THE INVENTION

1. Field of the Invention

The present invention relates, generally, to a vehicle seat assembly, and more specifically to a vehicle seat assembly having an active head restraint system.

2. Description of the Related Art

Conventional vehicle seat designs of the type commonly found in the related art typically include a seatback assembly, a lower seat assembly, recliner mechanism, manual or power adjustment mechanism for adjusting a number of positions of either the seatback or lower seat assemblies, as well as a number of safety features including occupant restraint devices such as seatbelts. The seatback assembly also includes a headrest or head restraint that is typically mounted at the top or upper end of the seatback.

In the context of vehicle seat design, there is an ongoing effort to improve the safety of the vehicle occupant in the event of a rear end collision. More specifically, there continues to be an ongoing effort to provide safety mechanisms that reduce the chance of injury in the region of the passengers' neck. In the event of a rear end collision, the occupant is forced against the seat and can experience a large energy pulse. In such circumstances, there is often a separation between the head and neck area of the occupant and the head restraint. Depending on the force of the rear end collision, this separation can be quickly and violently closed by movement of the upper torso, neck, and head of the passenger toward the seatback in an event commonly known as "whiplash." Thus, there has been an ongoing effort to address this problem in the context of vehicle seating safety.

In the past, the head restraint was a relatively static device that was typically moveable up and down or slightly tiltable, but usually in connection with adjustments made for the comfort of any given occupant of the seat during normal driving conditions. However, in order to address the problems encountered during a rear end collision, dynamic or active head restraint mechanisms have been proposed in the related art.

For example, U.S. Pat. No. 5,938,279 issued to Schubring et al. and assigned to the assignee of the present invention discloses an active vehicle head restraint assembly that is designed to reduce the amount of separation between the occupant and the head restraint in the event of a rear end collision. The head restraint assembly includes an impact or target plate that is supported by the seatback frame in the general area corresponding to the thoracic or shoulder area of the occupant. The impact plate is pivotally mounted to a linkage that is connected to the head restraint. In the event of a rear end collision, the force of the occupant on the target plate actuates the linkage to cause the head restraint to move toward the head of the occupant, thereby reducing the amount of separation between the occupant and the head restraint.

While the active head restraint systems of the type known in the related art were an improvement over the previously known static head restraints, there remains a need in the art for systems that better absorb and dissipate the energy generated by the force acting on the seatback in the event of a rear end collision, especially at the pelvic and lumbar areas, which are generally remote from the head restraint.

In addition to active head restraint systems, vehicle seat assemblies can include lumbar support members positioned in the general area corresponding to the lumbar area of the occupant. The lumbar support members make the seat more comfortable to sit upon. In the event of a rear end collision, the lumbar support members can absorb energy from the occupant that would otherwise be received by the active head restraint system. As such, the active head restraint system may not receive sufficient energy from the occupant to adequately move the head restraint. Therefore, there remains a need in the art for a vehicle seat assembly with an active head restraint and a lumbar support member in which the head restraint more readily moves toward the occupant during a rear end collision.

SUMMARY OF THE INVENTION

The disadvantages of the related art are overcome in the vehicle seat assembly of the present invention having a seatback frame and an upper armature moveably supported by the seatback frame. The upper armature includes a head restraint and a first impact body, and the upper armature is operable to move in response to a predetermined force applied to the first impact body to thereby move the head restraint toward the occupant. The vehicle seat assembly also includes a lower armature that is operatively connected to the upper armature and is operable to move toward the upper armature in response to a predetermined force applied to the lower armature and act on the upper armature to move the head restraint toward the occupant.

In another aspect, the present invention is directed toward a vehicle seat assembly having a seatback frame and an upper armature moveably supported by the seatback frame. The upper armature includes a head restraint and a first impact body. The upper armature is operable to move in response to a predetermined force applied to the first impact body to thereby move the head restraint toward the occupant. The vehicle seat assembly also includes a lower armature with a second impact body. At least one transfer rod is fixed to the seatback frame and operatively connected to the second impact body and the upper armature. The transfer rod is operable to act upon the upper armature in response to a predetermined force applied to the second impact body to move the head restraint toward the occupant.

In this way, the vehicle seat assembly of the present invention provides an active head restraint system that is more responsive to forces that are imparted to the seatback by the occupant. The vehicle seat assembly more efficiently transfers forces from the occupant to the head restraint such that the head restraint moves toward the occupant more quickly. As such, the vehicle seat assembly better supports the occupant during a rear end collision and makes injury less likely. Furthermore, the active head restraint system receives sufficient energy from the lumbar and/or pelvic areas of the occupant to adequately move the head restraint unlike related prior art vehicle seat assemblies in which that energy is simply absorbed. Finally, the vehicle seat assembly of the present invention addresses these specific problems in a system that is relatively efficient, lightweight, robust, and cost effective.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE PREFERRED EMBODIMENT(S)

Figure 1:
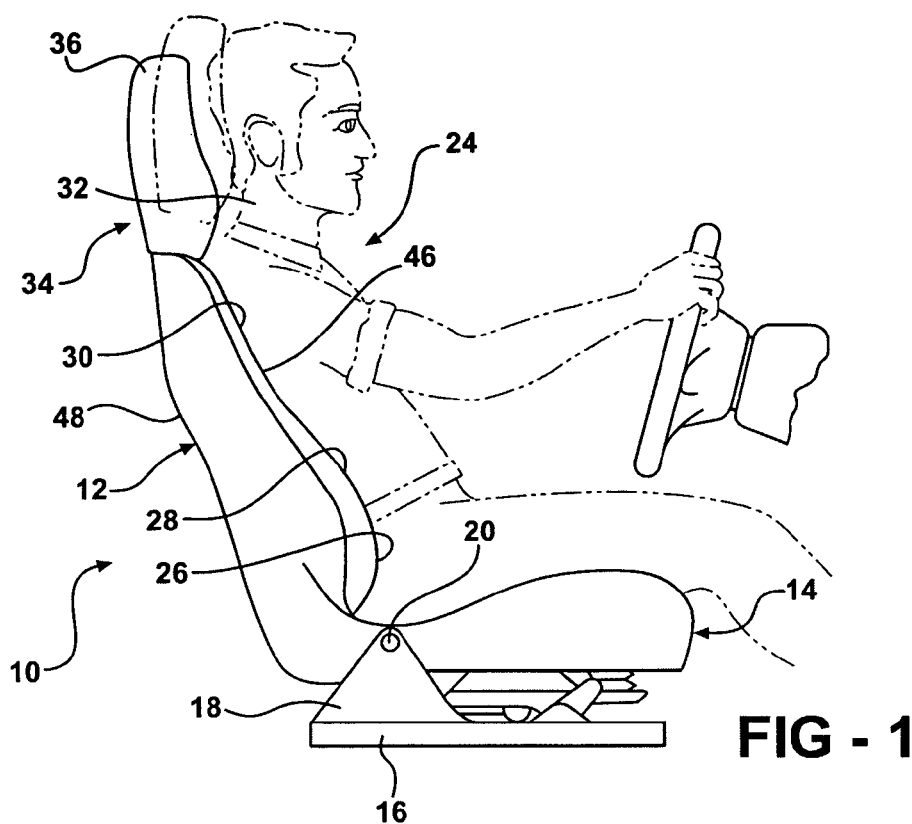
FIG. 1 is an elevational side view of a vehicle seat assembly of the present invention illustrated in relation to a schematically shown occupant of the vehicle seat assembly.

Referring now to the drawings, where like numerals are used to designate like structure throughout the Figures, a vehicle seat assembly of the present invention is generally indicated at 10 in FIG. 1. The vehicle seat assembly 10 includes a seatback, generally indicated at 12, and a lower seat assembly, generally indicated at 14, that is supported on a seat track mechanism 16, as is commonly known in the art. The seatback 12 may be pivotally connected to the lower seat assembly 14 by means of a bracket 18 at pivot point 20 that forms a part of the seat track mechanism 16. In this way, the vehicle seat assembly 10 may be adapted to recline or adjust in a number of ways that are commonly known in the art. In addition to these common elements, the seat assembly 10 of the present invention may include various controls and restraint systems, such as seatbelts, etc. that are not shown, but that are well known in the art.

An occupant, generally indicated at 24, is shown in phantom seated upon the vehicle seat assembly 10. The occupant 24 has a pelvic area 26, which is proximate to both the lower seat assembly 14 and to the lower end of the seatback 12. The occupant 24 also has a lumbar area 28 supported above the pelvic area 26, and a shoulder or thoracic area 30 supported above the lumbar area 28. Furthermore, the occupant 24 has a head and neck area 32 supported above the thoracic area 30.

The vehicle seat assembly 10 also includes an active head restraint system, generally indicated at 34, operatively supported by the seatback 12. The active head restraint system 34 includes a head restraint 36 proximate to the head and neck area 32 of the occupant 24. The head restraint 36 can be positioned in an upright position (shown in solid in FIG. 1) and can be positioned in an operative position (shown in phantom in FIG. 1), wherein the head restraint 36 is pivoted forward and upward, toward the head and neck area 32 of the occupant 24. In the event of a rear end collision, the forces that are generated can cause the occupant 24 to be driven generally rearward against the seatback 12. As will be described in greater detail below, forces from the occupant 24 on the seatback 12 are transferred through the active head restraint system 34 to ultimately move the head restraint 36 from the upright position to the operative position toward the head and neck area 32 of the occupant 24. This movement of the head restraint 36 better supports the head and neck area 32 of the occupant 24 during the rear end collision, reducing the likelihood of a whiplash injury.

Figure 3:
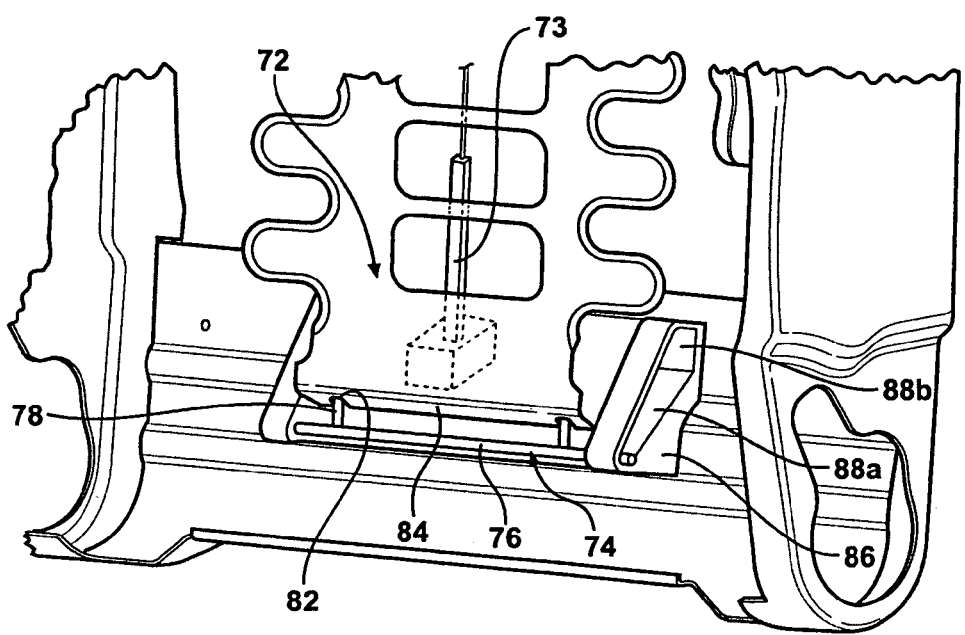
FIG. 3 is a side perspective view of the lower end of the vehicle seat assembly shown in FIG. 2.
Figure 2:
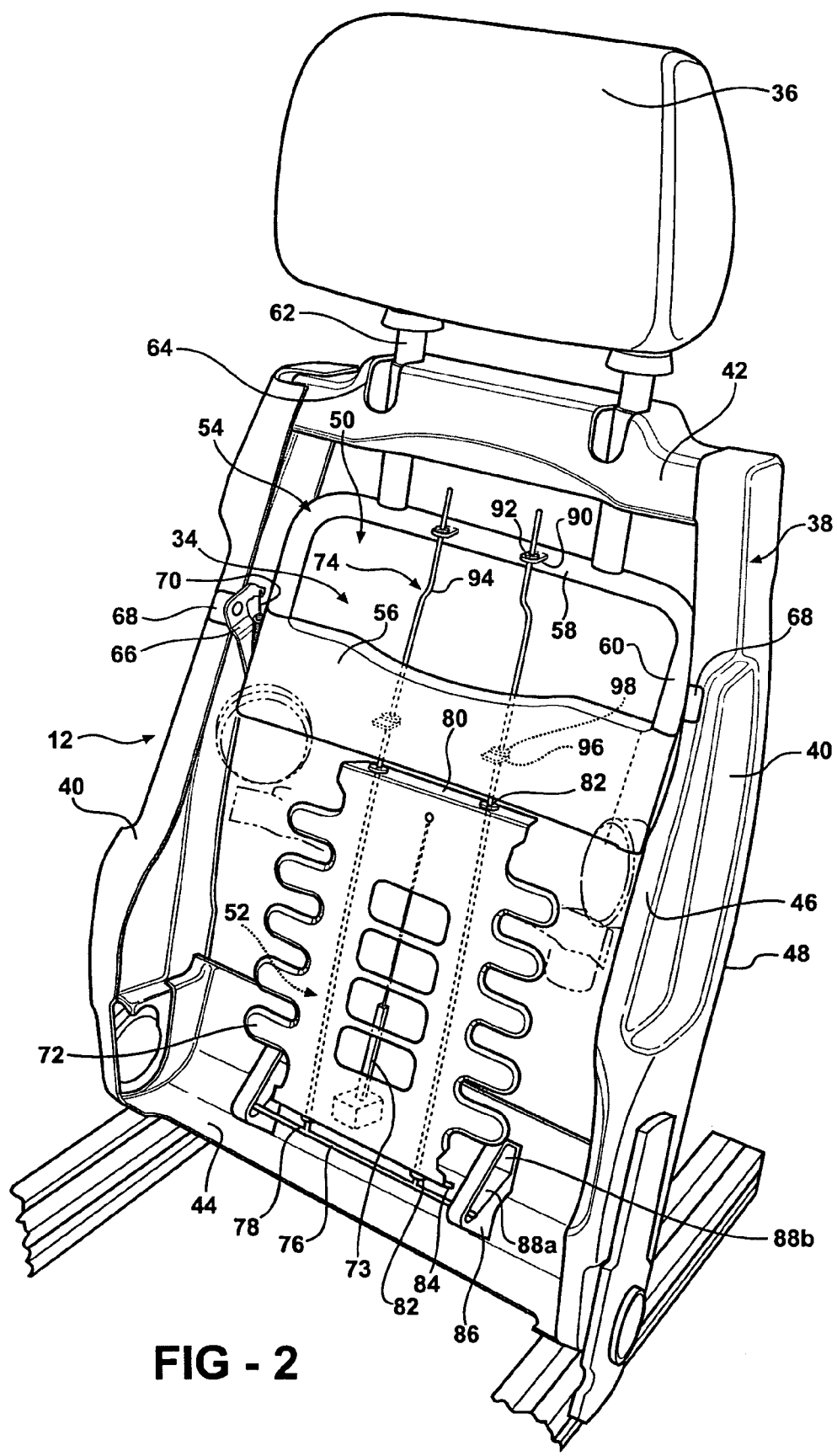
FIG. 2 is a front perspective view of one embodiment of the vehicle seat assembly of the present invention with an active head restraint system.

Referring to FIGS. 2 and 3, one embodiment of the seatback 12 of the vehicle seat assembly 10 is shown in more detail. The vehicle seat assembly 10 includes a seatback frame, generally indicated at 38. The seatback frame 38 includes a pair of side frame members 40 that are disposed in a generally vertical orientation and are spaced horizontally relative to one another. The seatback frame 38 also includes upper and lower cross members 42, 44, respectively, that extend horizontally between the pair of side frame members 40. As such, the seatback frame 38 defines a forward side 46 and a rearward side 48 of the seatback 12. The seatback frame 38 may have a "unibody" construction wherein the side frame members 40 as well as the upper and lower cross member 42, 44 are integrally formed. In addition, the seatback frame 38 may be assembled from separate components making up the side frame members 40 and upper and lower cross members 42, 44 that are then welded or otherwise permanently fixed to each other. Thus, and from the description that follows, those having ordinary skill in the art will appreciate that a number of different means of operatively interconnecting the components of the seatback frame 38 may be employed without departing from the scope of the present invention.

As shown in FIG. 2, the active head restraint system 34 generally includes an upper armature, generally indicated at 50, and a lower armature, generally indicated at 52. The upper armature 50 includes the head restraint 36, a first impact body 56, and a support structure, generally indicated at 54, each of which will be described in greater detail below. The upper armature 50 is moveably supported by the seatback frame 38. The lower armature 52 is operatively connected to the upper armature 50 and is disposed below the upper armature 50. As will be described in greater detail below, the upper armature 50 can move in response to a predetermined force applied to the first impact body 56 to thereby move the head restraint 36 toward the occupant. In addition, the lower armature 52 is operable to move toward the upper armature 52 in response to a predetermined force applied to the lower armature 52 and act on the upper armature 50 to move the head restraint 36 toward the occupant 24. As such, the head and neck area 32 of the occupant 24 is better supported during a rear end collision.

One embodiment of the upper armature 50 is illustrated in FIG. 2. As noted above, the upper armature 50 includes a support structure 54. The support structure 54 includes a cross bar 58, a plurality of legs 60, and a plurality of posts 62. The cross bar 58 extends in a generally transverse direction relative to the side frame members 40, and the legs 60 extend perpendicularly from opposing ends of the cross bar 58 toward the lower armature 52. The posts 62 extend perpendicularly from the cross bar 58 away from the lower armature 52. The upper cross member 42 of the seatback frame 38 includes a plurality of apertures 64 through which the posts 62 extend. In the embodiment shown, the apertures 64 are elongate and disposed near the forward side 46 of the seatback 12 so as to allow forward swinging movement of the posts 62 toward the occupant 24. The vehicle seat assembly 10 can include a bushing (not shown) or other similar component near the apertures 64 that facilitate swinging movement of the posts 62 toward the occupant 24. In one embodiment, the cross bar 58 and the legs 60 are constructed with a bent metal tube and the posts 62 are fixed to the cross bar 58 with welds or other suitable means. However, the support structure 54 could be constructed in any other suitable way without departing from the scope of the invention.

The support structure 54 supports the head restraint 36. For instance, the head restraint 36 is mounted to an upper end of each post 62 such that movement of the support structure 58 coincidentally moves the head restraint 36. The head restraint 36 can be rigidly mounted to the upper end of the posts 62 or the head restraint 36 could be moveably mounted to the posts 62 in a known manner to allow the head restraint to be tilted, raised, and/or lowered relative to the posts 62 without departing from the scope of the invention.

The support structure 54 also supports the first impact body 56. In one embodiment, the first impact body 56 extends transversely between and is connected at opposing ends to the legs 60 of the support structure 54. As such, the first impact body 56 is disposed so as to be proximate to the thoracic area 30 of the occupant 24. As will be described in greater detail below, the occupant 24 can apply a force to the first impact body 56, and if that force exceeds a predetermined level, the first impact body 56 acts on the support structure 54 to move the head restraint 36 toward the occupant 24.

As shown in FIG. 2, the vehicle seat assembly 10 also includes at least one, and preferably, a plurality of linkages 66 pivotally supporting the upper armature 50 on the seatback frame 38. In the embodiment shown, a linkage 66 is pivotally connected to each of the legs 60 of the support structure 54, and each linkage 66 is pivotally connected to one of the side frame members 40. The linkages 66 can be connected to the legs 60 and to the side frame members 40 in any suitable manner, such as fasteners, bearings, or the like. In the embodiment shown, the seatback frame 38 includes a plurality of fastening brackets 68, each fixed to the forward side 46 of one of the side frame members 40 and extending perpendicularly toward the rearward side 48 of the seatback 12. The fastening brackets 68 provide a means of pivotally attaching the linkages 66 to the seatback frame 38.

The vehicle seat assembly 10 further includes at least one, and preferably, a plurality of biasing members 70 as shown in FIG. 2. Each biasing member 70 is operatively connected to one of the linkages 66 and to one of the side frame members 40 of the seatback frame 38. The biasing members 70 bias the upper armature 50 toward the upright position. Thus, the biasing members 70 provide resistance for the upper armature 50 from pivoting relative to the seatback frame 38. In the embodiment shown, the biasing member 70 is a coiled extension spring, but the biasing member 70 could be any other suitable member, such as a torsion spring, without departing from the scope of the invention.

Referring specifically to FIGS. 2 and 3, one embodiment of the lower armature is generally shown at 52. The lower armature 52 includes a second impact body 72. Preferably, the second impact body 72 is of a size and is disposed such that it can readily receive forces imparted from the occupant 24. For instance, in the embodiment shown, the second impact body 72 is generally planar, is disposed proximate to the forward side 46 of the seatback 12, and extends within nearly the entire space defined by the side frame members 40 and the lower cross member 44 and the upper armature 50. As such, the second impact body 72 is disposed so as to be proximate to the lumbar area 28 and pelvic area 26 of the occupant 24. However, the second impact body 72 could be disposed proximate to only one of the pelvic and lumbar areas 26, 28 of the occupant 24 without departing from the scope of the invention. Also, the second impact body 72 is preferably made out of a flexible material such that the second impact body 72 is comfortable to sit against in ordinary driving situations and such that the second impact body 72 readily transfers forces imparted by the occupant during a rear end collision.

In one embodiment, the vehicle seat assembly 10 can include an adjustment mechanism 73 (shown in phantom) operable to adjust the height and/or curvature of the second impact body 72 for increased comfort of the vehicle seat assembly 10. Those having ordinary skill in the art will appreciate, however, that second impact body 72 could be nonadjustable without departing from the scope of the invention.

The lower armature 52 further includes at least one transfer rod, generally indicated at 74 in FIGS. 2 and 3. In the embodiment shown, the transfer rod 74 includes a lower cross bar 76 and at least one, and preferably, a plurality of linking rods 78. The lower cross bar 76 extends perpendicularly between the two side frame members 40, and the linking rods 78 are connected to the lower cross bar 76 by welding or other suitable means and extend therefrom generally toward the upper armature 50. The transfer rod 74 is operatively connected to the second impact body 72. In one embodiment, the second impact body 72 includes at least one, and preferably, a plurality of apertures 82 (FIGS. 2 and 3) through which the transfer rod 74 extends to thereby operatively connect the transfer rod 74 to the second impact body 72. For instance, in the embodiment shown, the second impact body 72 includes an upper flange 80 (FIG. 2) that extends toward the rearward side 48 of the seatback 12. The upper flange 80 includes a plurality of apertures 82 corresponding in number to that of the linking rods 78. Likewise, the second impact body 72 includes a lower flange 84 (FIG. 3) that extends toward the rearward side 48 of the seatback 12, and the lower flange 84 includes a plurality of apertures 82 corresponding in number to that of the linking rods 78. Individual linking rods 78 extend through individual ones of the apertures 82 on the upper flange 80 and also individual ones of the apertures 82 on the lower flange 84. As such, forces imparted from the occupant 24 to the second impact body 72 transfer to the transfer rod 74, and as will be described in greater detail below, forces from the transfer rod 74 transfer to the upper armature 50 to thereby move the head restraint 36 toward the occupant 24.

The vehicle seat assembly 10 further includes at least one, and preferably, a plurality of ramps 86 as shown in FIGS. 2 and 3. Each ramp 86 is mounted to the lower cross member 44 of the seatback frame 38, behind the second impact body 72. Each ramp 86 also includes at least one cam surface 88 (FIG. 3) that extends generally toward the upper armature 50. In the embodiment shown, each ramp 86 includes a first cam surface 88a that is in communication with a second cam surface 88b. The first cam surface 88a is disposed nearer the lower cross member 44 in comparison with the second cam surface 88b. The first cam surface 88a, extends from the forward side 46 and toward the rearward side 48 of the seatback 12 and from the lower cross member 44 toward the upper armature 50. The second cam surface 88b extends upward toward the upper armature 50 and is generally parallel to the side frame members 40. Those having ordinary skill in the art will appreciate that the ramp 86 can include any number of cam surfaces oriented in any manner toward the upper armature 50 without departing from the scope of the invention. The ends of the lower crossbar 76 of the transfer rod 74 are slidably supported on the cam surfaces 88a, 88b for guided movement thereon. As such, the lower crossbar 76 of the transfer rod 74 moves toward the upper armature 50 on said cam surfaces 88a, 88b in response to a predetermined force applied to the second impact body 72. In the preferred embodiment shown in FIG. 3, the cam surfaces 88a, 88b are enclosed by the corresponding ramp 86 to retain the lower crossbar 76 within the ramps 86. The transfer rod 74 can include retainers (not shown), such as washers fixed to the lower crossbar 76, that abut against the ramps 86 to further retain the lower crossbar 76 therein.

The transfer rod 74 is also operatively connected to the upper armature 50. In one preferred embodiment, the transfer rod 74 is moveably connected to the support structure 54. For instance, in the embodiment shown in FIG. 2, the support structure 54 of the upper armature 50 includes at least one, and preferably a plurality of tabs 90 corresponding in number to that of the linking rods 78. Each tab 90 has at least one aperture 92 extending therethrough, and one of the linking rods 78 extends through the aperture 92 so as to be moveably connected to the tab 90. Each linking rod 78 includes a bend 94 operative to abut against the corresponding tab 90 when the transfer rod 74 moves toward the upper armature 50. Abutment of the bend 94 against the tab 90 moves the upper armature 50 so as to move the head restraint 36 toward the occupant as will be described in greater detail below. Those having ordinary skill in the art will appreciate, however, that the transfer rod 74 could be operatively connected to the upper armature 50 in any other suitable manner, such as a hinge joint (not shown). Those having ordinary skill in the art will also appreciate that the transfer rods 74 could be connected anywhere on the upper armature 50, such as on the legs 60 of the support structure 54 without departing from the scope of the invention.

In the embodiment shown, the transfer rod 74 is also operatively connected to the first impact body 56. In the embodiment shown, the first impact body 56 includes at least one, and preferably, a plurality of tabs 96 (shown in phantom in FIG. 2) corresponding in number to that of the linking rods 78. Each tab 96 has at least one aperture 98 extending therethrough, and one of the linking rods 78 extends through the aperture 98 so as to be moveably connected to the tab 96. The tabs 96 further operatively connect the transfer rod 74 to the upper armature 50 and also limit buckling of the linking rods 78 as the transfer rod 74 moves toward and acts upon the upper armature 50.

In the event of a rear end collision, the occupant 24 is driven into the seatback 12 and can apply a force to the first impact body 56. The upper armature 50 pivots relative to the seatback frame 38 against the biasing force of the biasing members 70 in response to the force applied to the first impact body 56. This motion of the upper armature 50 ultimately moves the head restraint 36 toward the head and neck area 32 of the occupant 24. As such, the head and neck area 32 of the occupant 24 is better supported during a rear end collision and injury is less likely to occur.

The occupant 24 can also apply a force to the second impact body 72 during a rear end collision. Consequently, the second impact body 72 and the connected transfer rod 74 begin to move toward the rearward side 48 of the seatback 12. However, as the lower cross bar 76 of the transfer rod 74 moves along the cam surfaces 88a, 88b, the transfer rod 74 moves upward toward the upper armature 50. More specifically, the lower crossbar 76 initially moves upward and rearward on the first cam surface 88a, and if the forces are sufficient, the lower crossbar 76 subsequently moves upward on the second cam surface 88b. Movement of the transfer rod 74 causes the bends 94 of the linking rods 78 to abut against the tabs 90 and act upon the upper armature 50 to thereby pivot the upper armature 50 and ultimately move the head restraint 36 toward the head and neck area 32 of the occupant 24. As such, the head and neck area 32 of the occupant 24 is better supported during a rear end collision and injury is less likely to occur.

The biasing members 70 return the upper armature 50 to the upright position. The biasing members 70 also inhibit the upper armature 50 from unnecessarily moving when lower levels of force are applied from the occupant 24, such as when the occupant simply leans back in the vehicle seat assembly 10. Preferably, the stiffness of the biasing members 70 is adjusted such that only forces exceeding a predetermined level will cause the upper armature 50 to actuate. The predetermined level of force is preferably selected based upon the forces involved in an average rear end collision.

Each of the lower armature 52 and the first impact body 56 can act cooperatively to pivot the upper armature 50, thereby causing the head restraint 36 to move toward the head and neck area 32 of the occupant 24 for improved support of the head and neck area 32 of the occupant 24 during a rear end collision. Those having ordinary skill in the art will appreciate, however, that in certain situations, the occupant 24 may impart force to only one of the lower armature 52 and the first impact body 56. Thus, the upper armature 50 is preferably designed to move when the occupant 24 imparts force to only one of the lower armature 52 and the first impact body 56.

Figure 4:
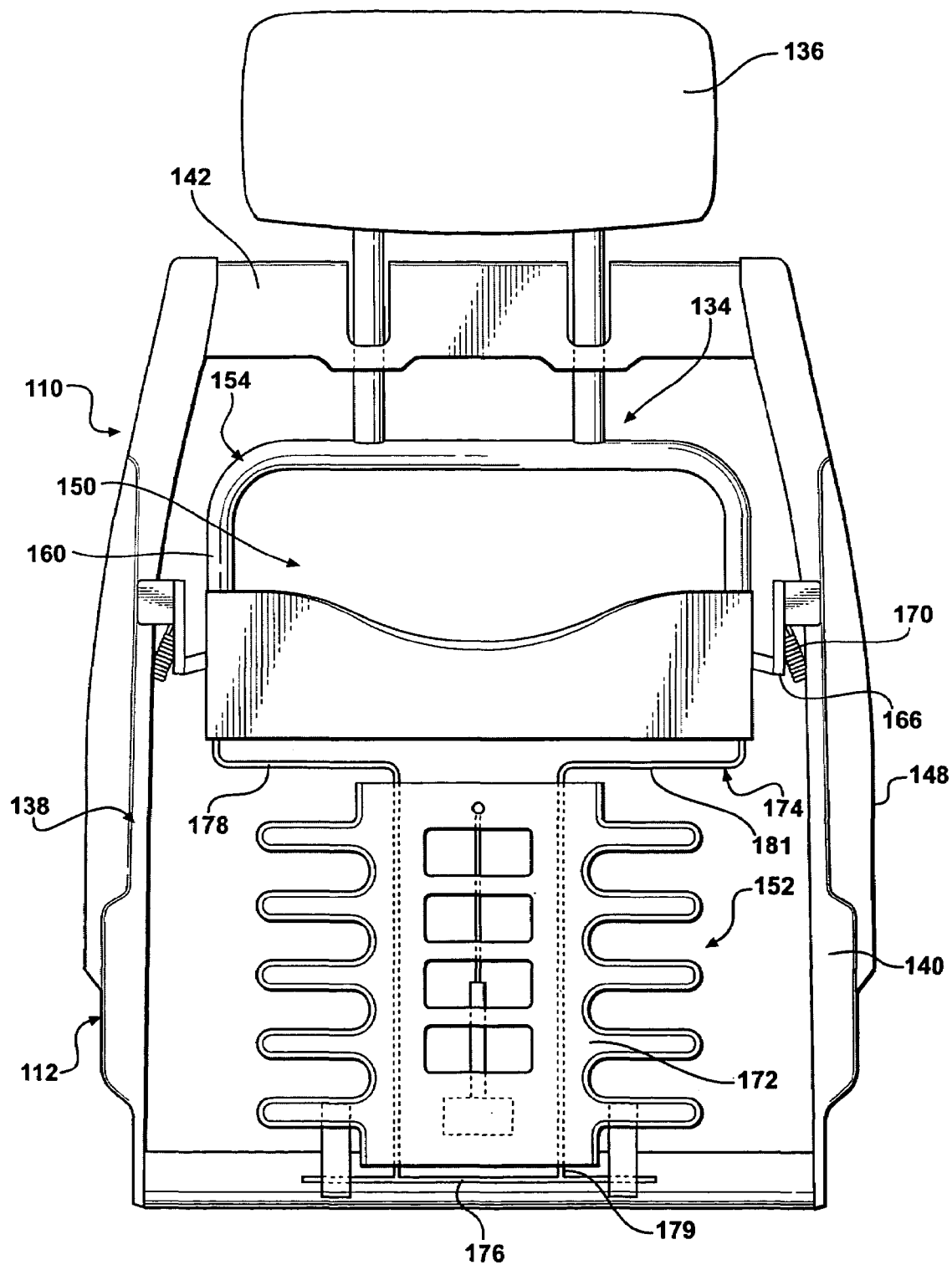
FIG. 4 is a front perspective view of another embodiment of the vehicle seat assembly of the present invention with an active head restraint system.

Another embodiment of the vehicle seat assembly is generally indicated at 110 in FIG. 4, where like numerals increased by 100 are used to designate like structure with respect to the embodiment shown in FIGS. 2 and 3. The vehicle seat assembly 110 includes an active head restraint system 134 that includes an upper armature 150 and a lower armature 152. The upper armature 150 is substantially similar to that shown in FIG. 2 except as noted below, and the lower armature 152 is included as an alternative to the lower armature 52 shown in FIG. 2. The vehicle seat assembly 110 includes at least one, and preferably, a plurality of linkages 166 that pivotally support the upper armature 150 on said seatback frame 138.

The lower armature 152 shown in FIG. 4 includes a transfer rod 174 that is fixed to the seatback frame 138. In the embodiment shown, the lower cross bar 176 is fixed to the lower cross member 144 of the seatback frame 138. The linking rods 178 of the transfer rod 174 are operatively connected to the second impact body 172 in a manner similar to the embodiment shown in FIGS. 2 and 3.

The linking rods 178 are also operatively connected to the upper armature 150. In one embodiment, the linking rods 178 are fixed to the upper armature 150 by welds or other suitable means. For instance, in the embodiment shown, the linking rods 178 include a lower portion 179 extending from the lower cross bar 176 parallel to the side frame members 140 and an upper portion 181 extending perpendicularly toward the side frame members 140. The terminal end of the upper portion 181 of each of the linking rods 178 is fixed to the terminal ends of the legs 160 of the support structure 154 of the upper armature 150.

Preferably, the transfer rod 174 is resiliently flexible. As such, the transfer rod 174 resiliently flexes and moves in response the force applied to the second impact body 172 during a rear end collision. In so doing, the transfer rod 174 acts upon the upper armature 150 by moving the legs 160 of the support structure 154 upward toward the upper cross member 142 and rearward toward the rearward side 148 of the seatback 112. Consequently, the head restraint 136 moves toward the head and neck area 32 of the occupant 24.

The vehicle seat assembly 110 can include at least one, and preferably, a plurality of biasing members 170 operatively connected to one of the linkages 166 and to the seatback frame 138 for biasing the upper armature 150 toward the upright position. Alternatively, the biasing members 170 are not included, and the resiliency of the transfer rod 174 is utilized to bias the upper armature 150 back toward the upright position.

In summary, the vehicle seat assembly 10, 110 of the present invention provides an active head restraint system 34, 134 that is more responsive to forces that are imparted to the seatback 12 by the occupant 24. The vehicle seat assembly 10, 110 more efficiently transfers forces from the occupant 24 to the head restraint 36, 136 such that the head restraint 36, 136 moves toward the occupant 24 more quickly. As such, the vehicle seat assembly 10, 110 better supports the occupant 24 during a rear end collision and makes injury less likely. Furthermore, the active head restraint system receives sufficient energy from the lumbar and/or pelvic areas of the occupant to adequately move the head restraint unlike related prior art vehicle seat assemblies in which that energy is simply absorbed. Finally, the vehicle seat assembly 10 of the present invention addresses these specific problems in a system that is relatively efficient, lightweight, robust, and cost effective.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A vehicle seat assembly comprising:
   a seatback frame;
   an upper armature moveably supported by said seatback frame, said upper armature including a head restraint and a first impact body, said upper armature operable to move in response to a predetermined force applied to said first impact body to thereby move said head restraint toward the occupant; and
   a lower armature including at least one transfer rod operatively connected to said upper armature and operable to move toward said upper armature in response to a predetermined force applied to said lower armature and act on said upper armature to move said head restraint toward the occupant; and
   at least one ramp operatively connected to said transfer rod, said ramp including at least one cam surface extending generally toward said upper armature, said transfer rod supported on said cam surface such that said transfer rod moves on said cam surface toward said upper armature in response to a predetermined force applied to said lower armature.

2. A vehicle seat assembly as set forth in claim 1, wherein said lower armature includes a second impact body operatively connected to, said transfer rod operatively connected to said second impact body and said upper armature and operable to move toward and act upon said upper armature in response to a predetermined force applied to said second impact body to move said head restraint toward the occupant.

3. A vehicle seat assembly as set forth in claim 2, wherein said upper armature includes a support structure supporting said head restraint and said first impact body, and wherein said transfer rod is operatively connected to said support structure.

4. A vehicle seat assembly as set forth in claim 3, wherein said transfer rod is also operatively connected to said first impact body.

5. A vehicle seat assembly as set forth in claim 2, wherein said transfer rod is moveably connected to said upper armature.

6. A vehicle seat assembly as set forth in claim 5, wherein said upper armature includes at least one tab having at least one aperture, said transfer rod extending through said aperture of said tab.

7. A vehicle seat assembly as set forth in claim 6, wherein said transfer rod includes a bend operative to abut against said tab when said transfer rod moves toward said upper armature.

8. A vehicle seat assembly as set forth in claim 2, wherein said second impact body includes at least one aperture through which said transfer rod extends to thereby operatively connect said transfer rod to said second impact body.

9. A vehicle seat assembly as set forth in claim 1, further including at least one linkage pivotally supporting said upper armature on said seatback frame for moving said head restraint toward the occupant.

10. A vehicle seat assembly as set forth in claim 9, further including at least one biasing member operatively connected to said linkage and to said seatback frame, said biasing member operable to bias said head restraint toward an upright position.

11. A vehicle seat assembly comprising:
    a seatback frame;
    an upper armature moveably supported by said seatback frame, said upper armature including a head restraint and a first impact body, said upper armature operable to move in response to a predetermined force applied to said first impact body to thereby move said head restraint toward the occupant; and
    a lower armature with a second impact body and at least one resiliently flexible transfer rod fixed between said seatback frame and said upper armature and adapted to directly connect said second impact body to said upper armature,
    wherein said transfer rod resiliently flexes in response to a predetermined force applied to said second impact body and acts upon said upper armature to move said upper armature which respondingly moves said head restraint toward the occupant.

12. A vehicle seat assembly as set forth in claim 11, wherein said upper armature includes a support structure supporting said head restraint and said first impact body, wherein said transfer rod is operatively connected to said support structure.

13. A vehicle seat assembly as set forth in claim 11, wherein said second impact body includes at least one aperture through which said transfer rod extends to thereby operatively connect said transfer rod to said second impact body.

14. A vehicle seat assembly as set forth in claim 11, further including at least one linkage pivotally supporting said upper armature on said seatback frame for moving said head restraint toward the occupant.

15. A vehicle seat assembly as set forth in claim 14, further including at least one biasing member operatively connected to said linkage and to said seatback frame, said biasing member operable to bias said head restraint toward an upright position.

* * * * *